United States Patent [19]

Chung et al.

[11] Patent Number: 5,110,879
[45] Date of Patent: May 5, 1992

[54] MISCIBLE BLENDS OF POLYIMIDE POLYMERS AND PROCESS FOR FORMING THE SAME

[75] Inventors: Tai-Shung Chung, Randolph; Rohitkumar H. Vora, Westfield, both of N.J.

[73] Assignee: Hoechst Celanese Corp., Somerville, N.J.

[21] Appl. No.: 513,645

[22] Filed: Apr. 24, 1990

[51] Int. Cl.⁵ .............................................. C08L 79/08
[52] U.S. Cl. ...................................... 525/432; 525/436
[58] Field of Search .............................. 525/432, 436

[56] References Cited

U.S. PATENT DOCUMENTS

| | | | |
|---|---|---|---|
| 3,505,168 | 4/1970 | Dunphy et al. | 525/432 |
| 4,107,125 | 8/1978 | Lovejoy et al. | 525/432 |
| 4,913,759 | 8/1990 | Wright et al. | 156/238 |
| 4,954,578 | 9/1990 | Ree et al. | 525/432 |

*Primary Examiner*—Ana L. Carrillo
*Attorney, Agent, or Firm*—Joseph M. Mazzarese

[57] ABSTRACT

Novel polyimide blends are formed of polyimide polymers each having moieties derived from dianhydride and diamine comonomers. The blends of the present invention may be formed by selecting polyimide polymers having structurally identical dianhydride-derived moieties, but structurally different diamine-derived moieties. Preferred miscible blends are formed wherein one of polyimides in the blend is the polymer condensation product of a dianhydride selected from 2,2-bis(3,4-dicarboxyphenyl) hexafluoropropane dianhydride, 3,3',4,4'-diphenyl tetracarboxylic dianhydride, 3,3',4,4'-benzophenone tetracarboxylic dianhydride, bis(3,4-dicarboxyphenyl ether dianhydride, pyromellitic dianhydride, and mixtures thereof, and 2,2-bis(3-aminophenyl) hexafluoropropane, and another of the polyimides in the blend is the polymer condensation product of the same dianhydride and mixtures thereof noted above, and 2,2-bis(4-aminophenyl) hexafluoropropane.

21 Claims, No Drawings

MISCIBLE BLENDS OF POLYIMIDE POLYMERS AND PROCESS FOR FORMING THE SAME

FIELD OF THE INVENTION

The present invention generally relates to miscible blends of polymers. More specifically, the present invention relates to miscible blends of at least two polyimides having moieties respectively derived from certain dianhydrides and diamines. The miscible blends of the present invention are particularly characterized by being formed of at least two polyimides (of a specific class of polyimides to be described below) having the same dianhydride-derived moiety, but different diamine-derived moieties.

BACKGROUND AND SUMMARY OF THE INVENTION

Polymer miscibility is inherently unpredictable. That is, for any given set of polymers, the underlying assumption has traditionally been that an immiscible blend will result. Thus, to discover sets of polymers that form miscible blends is typcially viewed as being the exception, and not the rule.

The present invention therefore relates to miscible blends of two or more polyimides from a class of polyimide polymers having repeating units derived from dianhydride and diamine comonomers. According to the present invention, it has been found that miscible blends of such polyimide polymers will result if the polyimide polymers in the blend have structurally identical dianhydride-derived moieties. In other words, polyimide polymers of the class to be described in greater detail below will form miscible blends with one another when the polymers in the blend have different diamine-derived moieties, provided that the dianhydride-derived moieties are structurally identical (e.g., derived from the same dianhydride monomer).

The miscible blends of the present invention may be usefully employed in end use applications requiring the physical properties of polyimides (e.g., as fabricated parts used in high temperature environments). In addition, the polyimide blends of this invention may be usefully employed to form membranes (e.g., in fiber or film form) used to separate gases, such as disclosed in commonly owned, copending U.S. application Ser. No. 505,099 filed in the name of Rachel S. KOHN et al on Apr. 3, 1990, now U.S. Pat. No. 5,055,116 and entitled "Gas Separation Membranes Comprising Miscible Blends of Polyimide Polymers", the entire content of the same being expressly incorporated hereinto by reference.

DETAILED DESCRIPTION OF THE PREFERRED EXEMPLARY EMBODIMENTS

The class of polyimides that form miscible blends of the present invention are characterized by having a molecular structure with recurring units (exclusive of any end cap units) of the formula:

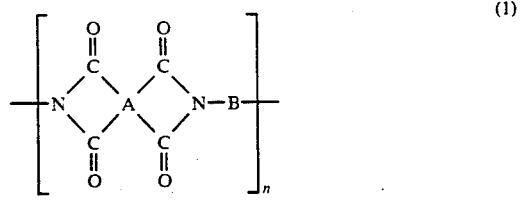

wherein the A moiety is a tetravalent aromatic radical containing at least one benzene, naphthalene or polyphenyl nucleus, the B moiety is a divalent aromatic radical, and n is an integer ranging from about 15 to about 300. The polyimides of the above general Formula (1) will be particulalry characterized by an inherent viscosity within the range of about 0.05 to about 4.00 dL/g as measured from a solution of the polymer in dimethylacetamide at 25° C. at a polymer concentration of 0.5 weight percent.

The polyimides of the above general formula are typically prepared in a two-step process in which a dianhydride and a diamine are first reacted to yield a polyamic acid. The polyamic acid is then converted to a polyimide in a second step. It will therfore be observed that the A moiety in the general formula above is associated with the dianhydride comonomer, whereas the B moiety is associated with the diamine comonomer. In other words, the dianhydride-derived and diamine-derived moieties in the above structural formula are joined to one another through the nitrogen atom, the latter being contributed by the diamine comonomer.

It has thus been found, according to the present invention, that miscible blends of two or more polyimides having a molecular structure of the general formula (1) above. may be formed, provided that the A moiety (which is contributed by the dianhydride comonomer) is identical as between each of the polyimides in the blend. The B moiety of one of the polyimides in the blend (which is contributed by the diamine comonomer) is, however, structurally different as compared to the B moiety of the other polyimide(s). Notwithstanding this structural dissimilarity of the B moieties, miscible blends of the polyimides ensue.

The preferred polyimides are prepared by reacting an aromatic dianhydride and an aromatic diamine. The exembplary dianhydride comonomers that may be employed to form the polyimides used in the blends of the present invention are those of the general Formula (2):

where A' is a tetravalent aromatic radical selected from

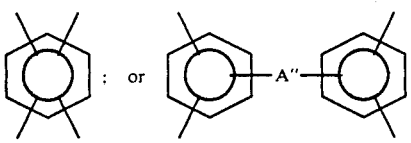

wherein A" is a direct link, or selected from

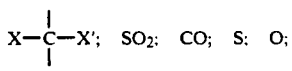

a perfluoro or alkylene linking group having 1 to 10 carbon atoms;

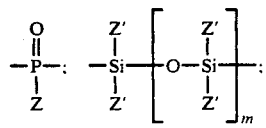

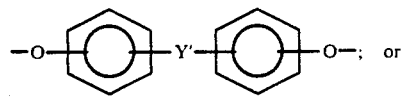

where Z is

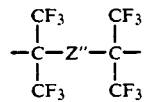

$CF_3$ or $CH_3$; Z', which may be the same or different, is selected from

and $CH_3$, Z" is selected from the group consisting of

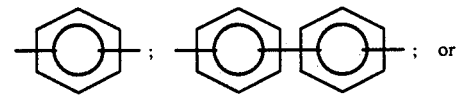

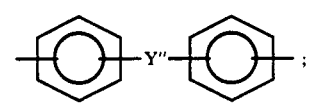

X and X', which may be the same or different, are each selected from

$CF_3$, $CH_3$, or hydrogen, m is an integer between 1 and 4, Y' and Y" are each selected from the group consisting of

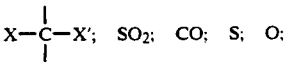

a perfluoro or alkylene linking group having 1 to 10 carbon atoms;

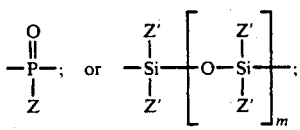

where X, X', Z, Z', and m are as defined above.

The tetravalent aromatic radical A' of the general Formula (2), above, may be substituted at any position with a substituent independently selected from the group consisting of hydrogen, $C_1$ to $C_3$ alkyl or alkoxy, halogen, hydroxy, $NO_2$, and $HC=CH_2$. In the preferrred polyimides used to form the miscible blends of this invention, the tetravalent aromatic radical A' of the general Formula (2) will be substituted only by hydrogen atoms.

The most preferred polyimides used to form the blends of the present invention are prepared by reacting a dianhydride of the general Formula (2) above, with an aromatic diamine having the formula:

$$NH_2-Y-NH_2$$

wherein Y is an aromatic moiety of a phenylene, naphthalene or a bis-phenylene type compound which may be unsubstituted or ring substituted with a halogen, hydroxy, lower $C_1$ to $C_6$ alkyl, or lower $C_1$ to $C_6$ alkoxy.

The preferred amines are diaryl diamines having the structure of general Formula (3):

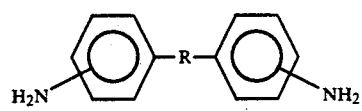

(3)

wherein R is a direct link;

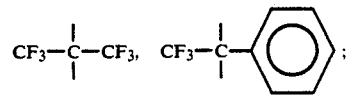

$SO_2$; CO; S;

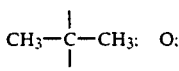

a perfluoro or alkylene linking group having 1 to 10 carbon atoms;

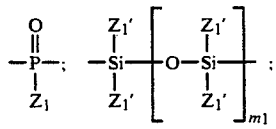

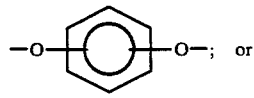

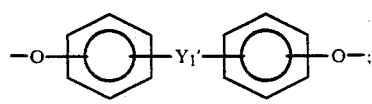

where $Z_1$ is

$CF_3$ or $CH_3$; $Z_1'$, which may be the same or different, is selected from

and $CH_3$, $m_1$ is an integer between 1 and 10, and $Y_1'$ is selected from

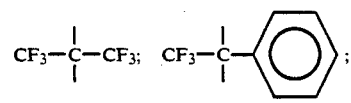

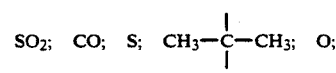

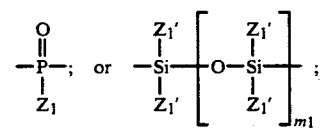

where $Z_1$, $Z_1'$, and $m_1$ are as defined above.

As will be appreciated by one of ordinary skill in the art, the polyimides formed from the dianhydrides and diamines illustrated in specific embodiments of the present invention can be copolymerized with each other or, for example, with one or more of the following dianhydrides or diamines:

Dianhydrides 1,2,4,5-benzene tetracarboxylic acid dianhydride;
1,2,3,4-benzene tetracarboxylic acid dianhydride;
1,4-bis(2,3-dicarboxyphenoxy) benzene dianhydride;
1,3-bis(3,4-dicarboxyphenoxy) benzene dianhydride;
1,2,4,5-naphthalene tetracarboxylic acid dianhydride;
1,2,5,6-naphthalene tetracarboxylic acid dianhydride;
1,4,5,8-naphthalene tetracarboxylic acid dianhydride;
2,3,6,7-naphthalene tetracarboxylic acid dianhydride;
2,6-dichloronaphthalene-1,4,5,8-tetracarboxylic acid dianhydride;
2,7-dichloronaphthalene-1,4,5,8-tetracarboxylic acid dianhydride;
2,3,6,7-tetrachloronaphthalene-1,4,5,8-tetracarboxylic acid dianhydride;
3,3',4,4'-diphenyl tetracarboxylic acid dianhydride;
2,2',3,3'-diphenyl tetracarboxylic acid dianhydride;
4,4'-bis(3,4-dicarboxyphenoxy)diphenyl dianhydride;
bis(2,3-dicarboxyphenyl) ether dianhydride;
bis(3,4-dicarboxyphenyl) ether dianhydride;
4,4'-bis(2,3-dicarboxyphenoxy) diphenyl ether dianhydride;
4,4'-bis(3,4-dicarboxyphenoxy) diphenyl ether dianhydride;
bis(3,4-dicarboxyphenyl) sulfide dianhydride;
4,4'-bis(2,3-dicarboxyphenoxy) diphenyl sulfide dianhydride;
4,4'-bis(3,4-dicarboxyphenoxy) diphenyl sulfide dianhydride;
bis(3,4-dicarboxyphenyl) sulfone dianhydride;
4,4'-bis(2,3-dicarboxyphenoxy) diphenyl sulfone dianhydride;
4,4'-bis(3,4-dicarboxyphenoxy) diphenyl sulfone dianhydride;
3,3',4,4'-benzophenone tetracarboxylic acid dianhydride;
2,2',3,3'-benzophenone tetracarboxylic acid dianhydride;
2,3,3'4'-benzophenone tetracarboxylic acid dianhydride;
4,4'-bis(3,4-dicarboxyphenoxy) benzophenone dianhydride;
bis(2,3-dicarboxyphenyl) methane dianhydride;
bis(3,4-dicarboxyphenyl) methane dianhydride;
1,1-bis(2,3-dicarboxyphenyl) ethane dianhydride;
1,1-bis(3,4-dicarboxyphenyl) ethane dianhydride;
1,2-bis(3,4-dicarboxyphenyl) ethane dianhydride;
2,2-bis(2,3-dicarboxyphenyl) propane dianhydride;
2,2-bis(3,4-dicarboxyphenyl) propane dianhydride;
2,2-bis[4-(2,3-dicarboxyphenoxy) phenyl]propane dianhydride;
2,2-bis[4-(3,4-dicarboxyphenoxy) phenyl]propane dianhydride;
4-(2,3-dicarboxyphenoxy)-4'-(3,4-dicarboxyphenoxy) diphenyl-2,2-propane dianydride;
2,2-bis[4-(3,4-dicarboxyphenoxy-3,5-dimethyl) phenyl] propane dianhydride;
2,3,4,5-thiophene tetracarboxylic acid dianhydride;
2,3,4,5-pyrrolidine tetracarboxylic acid dianhydride;
2,3,5,6-pyrazine tetracarboxylic acid dianhydride;
1,8,9,10-phenanthrene tetracarboxylic acid dianhydride;
3,4,9,10-perylene tetracarboxylic acid dianhydride;
2,2-bis(3,4-dicarboxyphenyl) hexafluoropropane dianhydride;
1,3-bis(3,4-dicarboxyphenyl) hexafluoropropane dianhydride;

1,1-bis(3,4-dicarboxyphenyl)-1-phenyl-2,2,2-trifluoroethane dianhydride;
2,2-bis[4-(3,4-dicarboxyphenoxy) phenyl] hexafluoropropane dianhydride;
1,1-bis[4-(3,4-dicarboxyphenoxy) phenyl]-1-phenyl-2,2,2-trifluoroethane dianhydride; and
4,4'-bis[2-(3,4-dicarboxyphenyl)hexafluoroisopropyl] diphenyl ether dianhydride; and

Diamines m-phenylene diamine;
p-phenylene diamine;
1,3-bis(4-aminophenyl) propane;
2,2-bis(4-aminophenyl) propane;
4,4'-diamino-diphenyl methane;
1,2-bis(4-aminophenyl) ethane;
1,1-bis(4-aminophenyl) ethane;
2,2'-diamino-diethyl sulfide;
bis(4-aminophenyl) sulfide;
2,4'-diamino-diphenyl sulfide;
bis(3-aminophenyl) sulfone;
bis(4-aminophenyl) sulfone;
4,4'-diamino-dibenzyl sulfoxide;
bis(4-aminophenyl) ether;
bis(3-aminophenyl) ether;
bis(4-aminophenyl) diethyl silane;
bis(4-aminophenyl) diphenyl silane;
bis(4-aminophenyl) ethyl phosphine oxide;
bis(4-aminophenyl) phenyl phosphine oxide;
bis(4-aminophenyl)-N-phenylamine;
bis(4-aminophenyl)-N-methylamine;
1,2-diamino-naphthalene;
1,4-diamino-naphthalene;
1,5-diamino-naphthalene;
1,6-diamino-naphthalene;
1,7-diamino-naphthalene;
1,8-diamino-naphthalene;
2,3-diamino-naphthalene;
2,6-diamino-naphthalene;
1,4-diamino-2-methyl-naphthalene;
1,5-diamino-2-methyl-naphthalene;
1,3-diamino-2-phenyl-naphthalene;
4,4'-diamino-biphenyl;
3,3'-diamino-biphenyl;
3,3'-dichloro-4,4'-diamino-biphenyl;
3,3'-dimethyl-4,4'-diamino-biphenyl;
3,4'-dimethyl-4,4'-diamino-biphenyl;
3,3'-dimethoxy-4,4'-diamino-biphenyl;
4,4'-bis (4-aminophenoxy)-biphenyl;
2,4-diamino-toluene;
2,5-diamino-toluene;
2,6-diamino-toluene;
3,5-diamino-toluene;
1,3-diamino-2,5-dichloro-benzene;
1,4-diamino-2,5-dichloro-benzene;
1-methoxy-2,4-diamino-benzene;
1,4-diamino-2-methoxy-5-methyl-benzene;
1,4-diamino-2,3,5,6-tetramethyl-benzene;
1,4-bis(2-methyl-4-amino-pentyl)-benzene;
1,4-bis(1,1-dimethyl-5-amino-pentyl)-benzene;
1,4-bis(4-aminophenoxy)-benzene;
1,3-bis(4-aminophenoxy)-benzene;
1,2-bis(4-aminophenoxy)-benzene;
1,4-bis(3-aminophenoxy)-benzene;
1,3-bis(3-aminophenoxy)-benzene;
1,2-bis(3-aminophenoxy)-benzene;
o-xylylene diamine;
m-xylylene diamine;
p-xylylene diamine;
3,3'-diamino-benzophenone;
4,4'-diamino-benzophenone;
2,6-diamino-pyridine;
3,5-diamino-pyridine;
1,3-diamino-adamantane;
3,3'-diamino-1,1,1'-diadamantane;
N-(3-aminophenyl)-4-aminobenzamide;
4-aminophenyl-3-aminobenzoate;
2,2-bis(4-aminophenyl) hexafluoropropane;
2,2-bis(3-aminophenyl) hexafluoropropane;
2-(3-aminophenyl)-2-(4-aminophenyl) hexafluoropropane;
2,2-bis[4-(4-aminophenoxy)phenyl] hexafluoropropane;
2,2-bis[4-(2-chloro-4-aminophenoxy)phenyl hexafluoropropane;
1,1-bis(4-aminophenyl)-1-phenyl-2,2,2-trifluoroethane;
1,1-bis[4-(4-aminophenoxy)phenyl]-1-phenyl-2,2,2-trifluoroethane;
1,4-bis(3-aminophenyl)buta-1-ene-3-yne;
1,5-bis(3-aminophenyl) decafluoropentane; and mixtures thereof.

The most preferred polyimides of the present invention are prepared by reacting at least one of 2,2-bis(3,4-dicarboxyphenyl) hexafluoropropane dianhydride, 3,3',4,4'-diphenyl tetracarboxylic dianhydride, 3,3',4,4'-benzophenone tetracarboxylic dianhydride, bis(3,4-dicarboxyphenyl ether dianhydride, and pyromellitic dianhydride, with a fluorine-containing diaryl diamine such as 2,2-bis(3-aminophenyl) hexafluoropropane, or 2,2-bis(4-aminophenyl) hexafluoropropane.

The dianhydrides used in accordance with the present invention are preferably substantially analytically pure, for example, "electronic" grade dianhydride is preferred. This grade of material contains more than 98.5% dianhydride, less than 1.5% of the corresponding monoanhydride-diacid and less than 0.1% of the corresponding tetra-acid. The 2,2-bis(3,4-dicarboxyphenyl) hexafluoropropane dianhydride (sometimes referred to herein as "6FDA") is commercially available from Hoechst Celanese Corporation, Route 202-206 North, Somerville, N.J. 08876. Electronic grade dianhydride contains less than 10 ppm sodium, less than 5 ppm iron, less than 2 ppm cobalt, and less than 2 ppm manganese, and has a melting point of 246.5 degrees Celsius.

The diamines utilized in accordance with the present invention are also preferably substantially analytically pure. For example, to obtain the preferred purity of the diamines noted hereinafter, an available grade or synthesized grade of 2,2-bis(4-aminophenyl) hexafluoropropane or 2,2-bis(3-aminophenyl) hexafluoropropane may be dissolved in aqueous hydrochloric acid and treated with activated charcoal, stirred for thirty minutes and filtered. The treatment is repeated as necessary to remove color impurities. The aqueous solution obtained after repeated filtering is treated with ammonium hydroxide until the pH of the resulting slurry is about 9. The diamine slurry is then filtered and washed with de-ionized or distilled water to form a filter cake, which in turn is redissolved in methanol and clarified through a five micron or smaller filter. Subsequently, diamine is precipitated from the methanol solution by the addition of distilled or de-ionized water and washed, also with water. The moist diamine is dried overnight in a vacuum oven and contains less than 10 ppm iron, sodium and chloride ions. Further information concerning diamines may be found in copending application Serial No. 105,857 filed Oct. 7, 1987, in the name of James R.

HAZEN and entitled "A Process for Bis(4-aminophenyl) hexafluoropropane," the entire disclosure of which is incorporated herein by reference.

The solvents which may be used in the polymerization process are organic solvents, preferably anhydrous, whose functional groups do not react with either the dianhydride or diamine reactant to any appreciable extent, and in which either the dianhydride or diamine, preferably both, are soluble. Examples of suitable solvents include N,N-dialkylcarboxylamide solvents such as N,N-dimethylformamide or N,N-dimethylacetamide; N-methyl-2-pyrrolidone; gamma-butyrolactone; pyridine; diglyme; and like materials as well as mixtures of such solvents.

In general, the polyimides forming the miscible blends of this invention have a weight average molecular weight within the preferred range of from about 25,000 up to about 400,000 and more preferably from about 50,000 up to about 280,000.

In the preferred process for preparing the polyimides that may be used to form the miscible blends of this invention, approximately equimolar quantities of a dianhydride and a diamine are utilized in accordance with the process described in copending U.S. patent application Ser. No. 217,929 filed Jul. 12, 1988 in the names of Rohitkumar VORA et al, the entire disclosure of which is incorporated herein by reference. In general, this process involves the polycondensation of a diamine and a dianhydride followed by the dehydration of the resulting polyamic acid to form a polyimide.

Preferably, the diamine is first dissolved in a polymerization solvent medium and the dianhydride is then gradually added portion wise under continuous agitation. After the addition of all of the monomer, the concentration of the reactants should be such that a solution concentration within the range of about 10 to about 30% by weight (preferably about 20% by weight) is achieved. Additional solvent may be added if necessary to achieve this level.

Polymerization is then conducted under anhydrous conditions while agitating the mixture maintained by a cooling bath at a temperature of less than about 35° C., preferably from about 20° C. to about 30° C. Polymerization is conducted for a time sufficient to form a polyamic acid having the desired molecular weight, usually a period of from about 8 to about 20 hours. The polyamic acid may then be converted to the polyimide by one of several techniques known in the art, for example, by heating the polyamic acid solution until imidization is substantially complete, or by combining the polyamic acid solution and a dehydrating agent, with or without catalyst, and optionally heating the resulting mixture until imidization is complete. The polyimide may then be recovered from solution by precipitation with alcohol (e.g., methanol) and washed with additional alcohol.

The resulting polyimides may then be blended in accordance with the present invention using conventional solution blending technology to yield a blend having specifically tailored properties. For example, the solid polyimides to be blended may be dissolved in a common solvent (e.g., methylene chloride) and in a common vessel under vigorous stirring. In the event that the solution is cloudy, hexafluoroisopropanol may be added dropwise until a clear solution is obtained. Thereafter, the solution may be filtered and subsequently degassed by subjecting the solution to a vacuum. Solids precipitation will then yield the solution-blended polyimides.

The preferred polyimides utilized in the present invention are miscible with one another at all polymer blend ratios, as evidenced by a single glass transition temperature (Tg °C.) which is between the highest and lowest glass transition temperatures attributable to respective individual polymer components employed in the blend. As used herein (and in the accompanying claims), the term "miscible" is intended to refer to a polymer blend (which comprises multiple polymer components) that exhibits a single glass transition temperature (Tg °C.) as measured by standard differential scanning calorimetry (DSC) techniques after the blend has been heated in an inert atmosphere to a temperature above the highest glass transition temperature attributable to a respective individual polymer component comprising the blend, and subsequently cooled.

The invention will be further illustrated by referennce to the following non-limiting Examples.

EXAMPLES

A. Synthesis Procedure

Several polyimides were prepared using the following synthesis route. The selected diamine monomer and freshly distilled N-methyl pyrrolidone (NMP) were added to a three neck flask fitted with a stirrer, condenser, ice water bath, and thermometer under a nitrogen atmosphere. The mixture was agitated for several minutes at room temperature to yield a clear, slightly yellow solution, which was then cooled to below room temperature (about 15° C.). The dianhydride monomer was then added portion-wise to the cooled solution in equal intervals and amounts over a period of about thirty minutes. The addtion of the dianhydride monomer was carefully executed while the reaction mixture was agitated gently so that the solution was maintained between 15° C. and 25° C.

Following the addition of the dianhydride, the individual beakers that contained the diamine and dianhydride monomers were washed with an additional amount of NMP to remove residual amounts of monomer therein. The NMP and residual monomer was then added to the reaction mixture to obtain a solution of about twenty percent nonvolatile concentration. The mixture, maintained at a uniform temperature between abotu 25° C. and 30° C., was agitated gently for about 16 hours to form polyamic acid. Beta-picoline was then added and fully dispersed in the polymerization mixture. Thereafter, acetic anhydride was added dropwise, with the resulting mixture being agitated gently for an additional 21 hours (also at a uniform temperature of between 25° C. to 30° C.) to complete cyclization.

The resulting polymer was precipitated from solution in methanol by the addition of methanol to the reaction liquor—that is, by reverse precipitation—using 2000 ml. of methanol for every 500 g of polymeric solution. The resulting polymer was then washed with additional fresh methanol and dried.

B. Monomer Nomenclature

In the polyimide examples below, the following monomer nomenclature has been used:

Dianhydrides

6FDA - 2,2-bis(3,4-dicarboxyphenyl) hexafluoropropane dianhydride

BPDA - 3,3',4,4'-diphenyl tetracarboxylic dianhydride
BTDA - 3.3',4,4'-benzophenone tetracarboxylic dianhydride
ODPA - bis(3,4-dicarboxyphenyl ether dianhydride
PMDA - pyromellitic dianhydride Diamines 3,3'-6FDAM - 2,2-bis(3-aminophenyl) hexafluoropropane diaryl diamine
4,4'-6FDAM - 2,2-bis(4-aminophenyl) hexafluoropropane diaryl diamine C. Polymer Preparation Using the synthesis procedures described above in Section A, several polyimides were prepared using dianhydride and diamine comonomers identified below:
Polyimide No. 1: 6FDA and 3,3'-6FDAM
Polyimide No. 2: 6FDA and 4,4'-6FDAM
Polyimide No. 3: BPDA and 3,3'-6FDAM
Polyimide No. 3: BPDA and 4,4'-6FDAM
Polyimide No. 5: BTDA and 3,3'-6FDAM
Polyimide No. 6: BTDA and 4,4'-6FDAM
Polyimide No. 7: ODPA and 3,3'-6FDAM
Polyimide No. 8: ODPA and 4,4'-6FDAM
Polyimide No. 9: BPDA/PMDA (50:50) and 3,3'-6FDAM
Polyimide No. 10: BPDA/PMDA (50:50) and 4,4''-6FDAM
Polyimide No. 11: BTDA/PMDA (50:50) and 3,3'-6FDAM
Polyimide No. 12: BTDA/PMDA (50:50) and 4,4'-6FDAM
Polyimide No. 13: ODPA/PMDA (50:50) and 3,3'-6FDAM
Polyimide No. 14: ODPA/PMDA (50:50) and 4,4'-6FDAM D. Preparation of Polyimide Blends 50/50 weight percent blends were prepared from the above-identifed polyimides as noted below:
Sample No. 1: Polyimide Nos. 1 and 2
Sample No. 2: Polyimide Nos. 3 and 4
Sample No. 3: Polyimide Nos. 5 and 6
Sample No. 4: Polyimide Nos. 7 and 8
Sample No. 5: Polyimide Nos. 9 and 10
Sample No. 6: Polyimide Nos. 11 and 12
Sample No. 7: Polyimide Nos. 13 and 14

It will be observed that each of the polyimides in the sample blends had structurally identical dianhydride-derived moieties (i.e., since identical dianhydride monomers were employed), but that the diamine-derived moieties were structurally different (i.e., since different diamine monomers were employed). Thus, the A moiety for each of the polyimides in the blend was structurally identical, but the B moiety was structurally different.

Blending of the polyimides was accomplished by adding the individual polyimides in a weight ratio of 1:1 to a common solvent (e.g., methylene chloride) in the same vessel under stirring conditions. The polyimides were added to an amount of solvent so that the total solids concentration was between 3–5% by weight. If the solution was cloudy, hexafluoroisopropanol was added dropwise unitl a clear solution was obtained. The solution was then filtered through a 0.2 micron Teflon ® PTFE filter and subsequently degassed by subjecting the solution to a vacuum. The polyimide was then precipitated in methanol and dried under vacuum at 70° C. for a few hours to overnight.

E. Glass Transition Temperature Measurements

The glass transition temperature (Tg °C.) for each of the polyimide blend samples noted above was obtained by subjecting the samples to differential scanning calorimetor (DSC), manufactured by Perkin-Elmer, in a nitrogen atmosphere. The samples were each heated at a rate of 20° C. per minute to 350°–380° C., cooled to room temperature and then subjected to a second heating cycle at a rate of 20° C. per minute. The glass transition temperature was measured during the second heating cycle. Table 1 below shows the glass transition temperature data that was obtained.

TABLE 1

| Sample No. | Tg1 (deg. C.) | Tg2 (deg. C.) | Tg of Blend (deg. C.) |
|---|---|---|---|
| 1 | 250.5 | 318.5 | 275.0 |
| 2 | 267.0 | 343.0 | 279.3 |
| 3 | 239.0 | 304.0 | 252.8 |
| 4 | 224.5 | 305.0 | 242.7 |
| 5 | 280.0 | 375.0 | 295.5 |
| 6 | 261.0 | 323.0 | 273.4 |
| 7 | 233.0 | 347.0 | 258.4 |

Note: Tg1 and Tg2 represent the glass transition temperatures associated with the odd-numbered and even-numbered individual polyimides, respectively, forming the sample blend.

It will be observed from the glass transition temperature data in Table 1 that each sample formed a miscible blend of the two polyimide components (as evidenced by a single glass transition temperature of the polyimide blend that was numerically between the glass transition temperatures attributable to each individual polyimide component in the blend), even though the components had different diamine-derived moieties. Thus, by providing polyimides with structurally identical dianhydride-derived moieties, miscible blends may be formed so that the resulting physical and/or thermal properties, for example, of such polyimide blends may be tailored to suit particular end-use applications.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A miscible blend of at least two polyimide polymers having different molecular structures, each of said polyimide polymers having recurring groups of the structure:

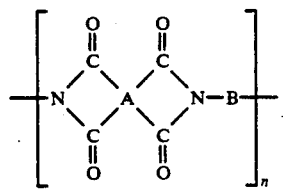

wherein;
(i) the moiety A is a tetravalent aromatic radical containing at least one benzene, naphthalene or polyphenyl nucleus, the moiety B is a divalent aromatic group, and n is an integer ranging from about 15 to 300, and wherein (ii) said A moieties for each of said at least two polyimide polymers are structurally identical to one another, and said B moieties for each of said at least two polyimide polymers are structurally different from one another.

2. The miscible blend of claim 1, wherein said moiety A for each of the polymers in the blend is the residue of a dianhydride monomer of the formula:

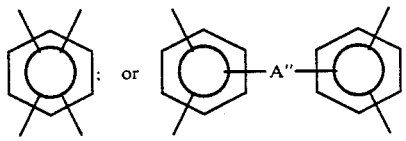
(2)

where A' is a tetravalent aromatic radical selected from

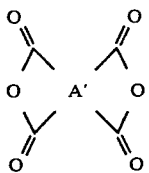

where A" is a direct link, or selected from

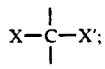

a perfluoro or alkylene linking group having 1 to 10 carbon atoms;

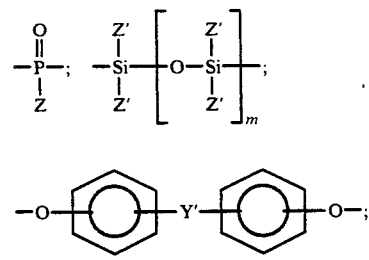

or

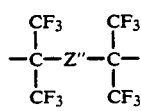

where Z is

$CF_3$ or $CH_3$; Z' is selected from

and $CH_3$, Z" is selected from the group consisting of

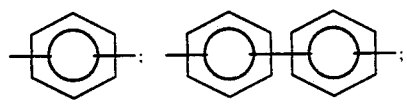

and

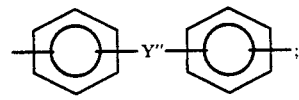

X and X', which may be the same or different, are each selected from

$CF_3$, $CH_3$, or hydrogen, m is an integer between 1 and 4, Y' and Y" are each selected from the group consisting of

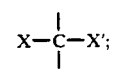

$SO_2$; CO; S; O;

a perfluoro or alkylene linking group having 1 to 10 carbon atoms;

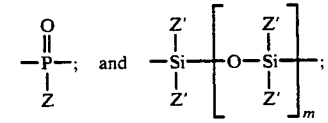

where X, X', Z, Z', and m are as defined above.

3. The miscible blend as in claim 2, wherein said tetravalent aromatic radical A' is substituted at any position with a substituent independently selected from the group consisting of hydrogen, $C_1$ to $C_3$ alkyl or alkoxy, halogen, hydroxy, $NO_2$, and $HC{=}CH_2$.

4. The miscible blend of claim 2, wherein said tetravalent aromatic radical A' for each of said at least two polyimides in said miscible blend is the residuum of a dianhydride monomer selected from the group consisting of 2,2-bis(3,4-dicarboxyphenyl) hexafluoropropane dianhydride, 3,3', 4,4'-diphenyl tetracarboxylic dianhydride, 3,3',4,4'-benzophenone tetracarboxylic dianhydride, bis(3,4-dicarboxyphenyl) ether dianhydride, pyromellitic dianhydride, and mixtures thereof.

5. The miscible blend of claim 2, wherein the B moieties are the residuum of diaryl diamines having the structure:

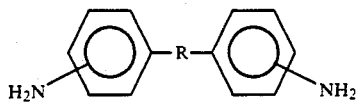

wherein R is a direct link;

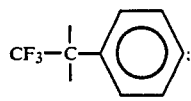

SO₂; CO; S;

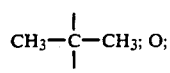

a perfluoro or alkylene linking group having 1 to 10 carbon atoms;

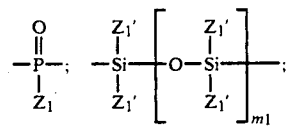

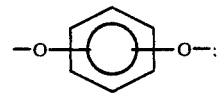

or

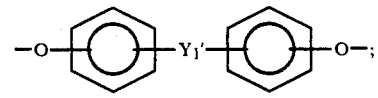

wherein Z₁ is

CF₃ or CH₃; Z₁' is selected from

and CH₃, m₁ is an integer between 1 and 10, and Y₁' is selected from

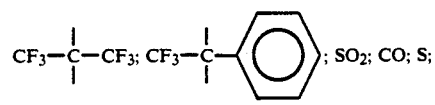

(3)

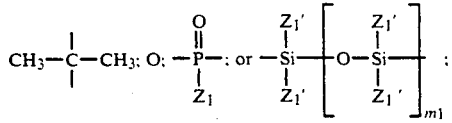

where Z', Z₁', and m₁ are defined above.

6. The miscible blend of claim 1 wherein at least one of said polyimides is the polymer condensation product of a dianhydride selected from the group consisting of 2,2-bis(3,4-dicarboxyphenyl) hexafluoropropane dianhydride, 3,3',4,4'-diphenyl tetracarboxylic dianhydride, 3,3',4,4'-benzophenone tetracarboxylic dianhydride, bis(3,4-dicarboxyphenyl) ether dianhydride, pyromellitic dianhydride, and mixtures thereof, and a diamine selected from the group consisting of 2,2-bis(3-aminophenyl) hexafluoropropane, and 2,2-bis(4-aminophenyl) hexafluoropropane diaryl diamines.

7. The miscible blend of claim 6 wherein at least two of said polyimides are said polymer condensation products.

8. The miscible blend of claim 7 wherein one of said polyimides is the polymer condensation product of a dianhydride selected from 2,2-bis(3,4-dicarboxyphenyl) hexafluoropropane dianhydride), 3,3',4,4'-diphenyl tetracarboxylic dianhydride, 3,3',4,4'-benzophenone tetracarboxylic dianhydride, bis(3,4-dicarboxyphenyl ether dianhydride, pyromellitic dianhydride, and mixtures thereof, and 2,2-bis(3-aminophenyl) hexafluoropropane and another of said polyimides is the polymer condensation product of said dianhydride and mixtures thereof, and 2,2-bis(4-aminophenyl) hexafluoropropane.

9. The miscible blend of claim 1 wherein at least one polyimide polymer has a weight average molecular weight within the range of from about 25,000 up to about 400,000.

10. The miscible blend of claim 1 wherein at least one polyimide polymer has a weight average molecular weight within the range of from about 50,000 up to about 280,000.

11. A method of making a miscible blend of at least two polyimide polymers having different molecular structures, comprising forming a blend of said at least two polyimide polymers, wherein each of said polyimide polymers has recurring groups of the structure:

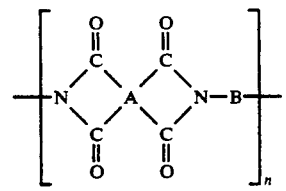

wherein;
(i) the moiety A is a tetravalent aromatic radical containing at least one benzene, naphthalene or polyphenyl nucleus, the moiety B is a divalent aromatic group, and n is an integer ranging from about 15 to 300, and wherein
(ii) said A moieties for each of said at least two polyimide polymers are structurally identical to one another, and said B moieties for each of said at least two polyimide polymers are structurally different from one another.

12. The method of claim 11, wherein said step of forming said miscible blend of said polyimide polymers includes forming a solution of said at least two polyimide polymers in common solvent, and then precipitating a blend of said at least two polyimide polymers from said common solvent.

13. The method of claim 11, wherein said moiety A for each of the polymers in the blend is the residue of a dianhydride monomer of the formula:

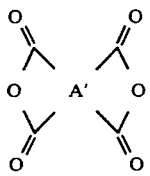 (2)

where A' is a tetravalent aromatic radical selected from

where A" is a direct link, or selected from

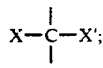

$SO_2$; CO; S; O;

a perfluoro or alkylene linking group having 1 to 10 carbon atoms;

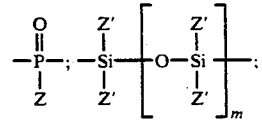

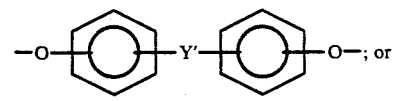

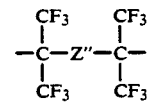

where Z is

$CF_3$ or $CH_3$; Z' is selected from

and $CH_3$, Z" is selected from the group consisting of

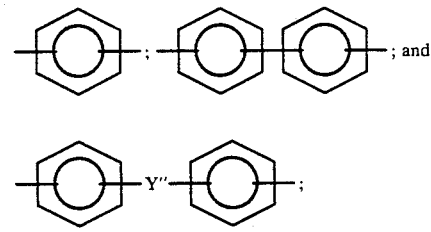

X and X', which may be the same or different, are each selected from, $CF_3$, $CH_3$, or hydrogen, m is an integer between 1 and 4, Y' and Y" are each selected from the group consisting of

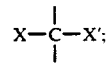

$SO_2$; CO; S; O;

a perfluoro or alkylene linking group having 1 to 10 carbon atoms;

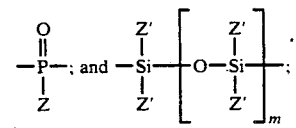

where X, X', Z, Z', and m are as defined above.

14. The method as in claim 13, wherein said tetravalent aromatic radical A' is substituted at any position with a substituent independently selected from the group consisting of hydrogen, $C_1$ to $C_3$ alkyl or alkoxy, halogen, hydroxy, $NO_2$, and $HC\!=\!CH_2$.

15. The method of claim 13, wherein said tetravalent aromatic radical A' for each of said at least two polyimides in said miscible blend is the residuum of a dianhydride monomer selected from the group consisting of 2,2-bis(3,4-dicarboxyphenyl) hexafluoropropane dianhydride, 3,3',4,4'-diphenyl tetracarboxylic dianhydride, 3,3',4,4'-benzophenone tetracarboxylic dianhydride, bis(3,4-dicarboxyphenyl) ether dianhydride, pyromellitic dianhydride, and mixtures thereof.

16. The method of claim 13, wherein the B moieties are the residuum of diaryl diamines having the structure:

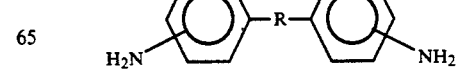

wherein R is a direct link;

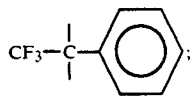

$SO_2$; CO; S;
a perfluoro or alkylene linking group having 1 to 10 carbon atoms;

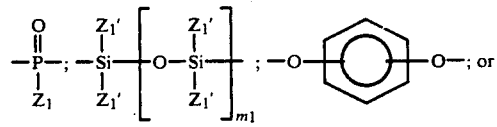

where $Z_1$ is

$CF_3$ or $CH_3$; $Z_1'$ is selected from

and $CH_3$, $m_1$ is an integer between 1 and 10, and $Y_1'$ is selected from

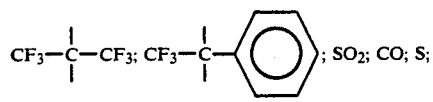

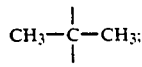

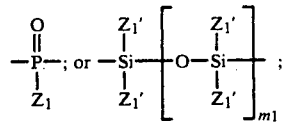

where $Z_1$, $Z_1'$, and $m_1$ are as defined above.

17. The method of claim 11 wherein at least one of said polyimides is the polymer condensation product of a dianhydride selected from the group consisting of 2,2-bis(3,4- dicarboxyphenyl) hexafluoropropane dianhydride, 3,3',4,4'-diphenyl tetracarboxylic dianhydride, 3,3',4,4'-benzophenone tetracarboxylic dianhydride, bis(3,4-dicarboxyphenyl) ether dianhydride, pyromellitic dianhydride, and mixtures thereof, and a diamine selected from the group consisting of 2,2-bis(3-aminophenyl) hexafluoropropane, and 2,2-bis(4-aminophenyl) hexafluoropropane diaryl diamines.

18. The method of claim 17 wherein at least two of said polyimides are said polymer condensation products.

19. The method of claim 18 wherein one of said polyimides is the polymer condensation product of a dianhydride selected from 2,2-bis(3,4-dicarboxyphenyl) hexafluoropropane dianhydride, 3,3',4,4'-diphenyl tetracarboxylic dianhydride, 3,3',4,4'-benzophenone tetracarboxylic dianhydride, bis(3,4-dicarboxyphenyl ether dianhydride, pyromellitic dianhydride, and mixtures thereof, and 2,2-bis(3-aminophenyl) hexafluoropropane and another of said polyimides is the polymer condensation product of said dianhydride and mixtures thereof, and 2,2-bis(4-aminophenyl) hexafluoropropane.

20. The method of claim 11 wherein at least one polyimide polymer has a weight average molecular weight within the range of from about 25,000 up to about 400,000.

21. The method of claim 11 wherein at least one polyimide polymer has a weight average molecular weight within the range of from about 50,000 up to about 280,000.

* * * * *